Aug. 15, 1967  RYOTARO ICHIKAWA  3,335,560
HOLLOW TWIST SYNTHETIC RESIN AND METHOD OF PRODUCING SAME
Filed Oct. 27, 1964  2 Sheets-Sheet 1

INVENTOR.
RYOTARO ICHIKAWA
BY *Albert Jacobs*
ATTORNEY

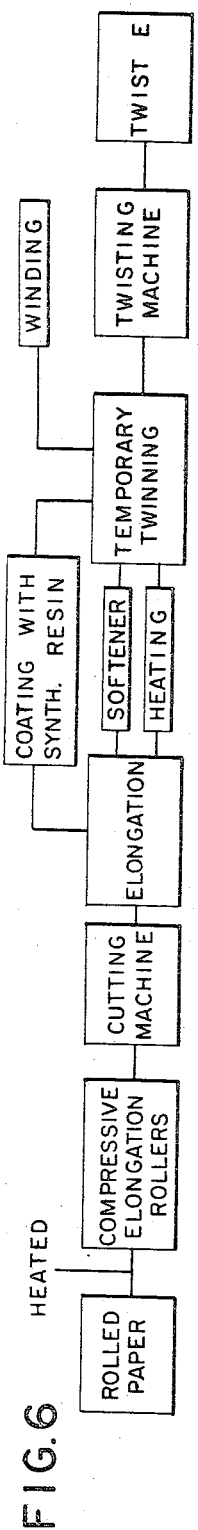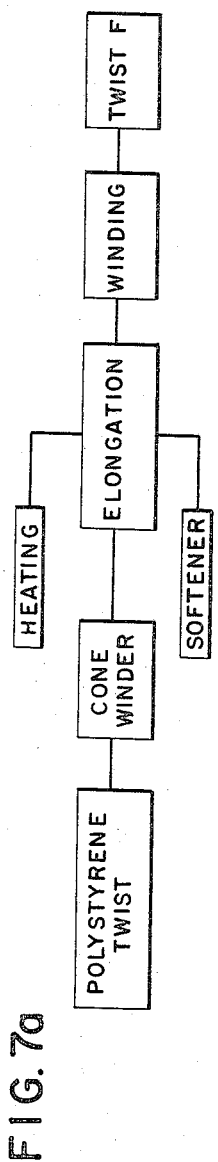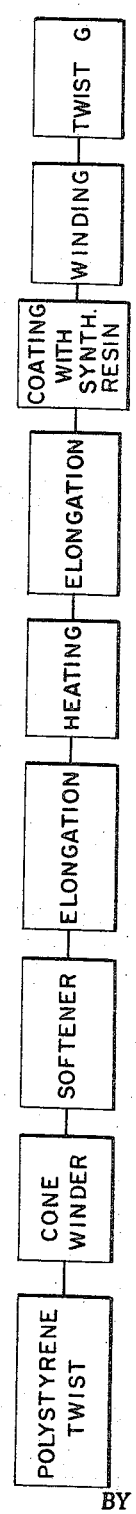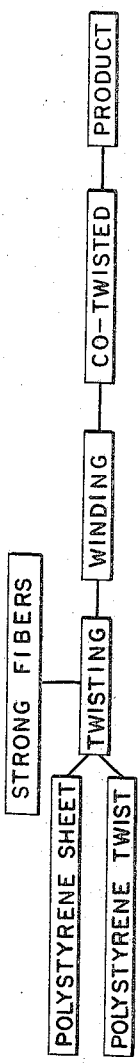

3,335,560
HOLLOW TWIST SYNTHETIC RESIN AND METHOD OF PRODUCING SAME
Ryotaro Ichikawa, 12 Tenjinbashisuji, 2-chome, Kita-ku, Osaka, Japan
Filed Oct. 27, 1964, Ser. No. 406,693
Claims priority, application Japan, Oct. 29, 1963, 38/58,094, 38/58,095, 38/58,096, 38/81,548
17 Claims. (Cl. 57—165)

ABSTRACT OF THE DISCLOSURE

Foamed synthetic resins such as styrene, methylstyrene, vinyl chloride, vinyl acetate, acetyl cellulose, copolymers and mixtures of these polymers are converted into hollow twists which exhibit improved mechanical strength which makes them suitable for knitting and weaving. The process comprises heating to a temperature lower than the melting point of the substance, elongating, cutting into suitable portions of a predetermined length and twisting. During these steps the sheets may also be softened or coated with a resin solution or subjected to another heating step.

---

The present invention relates to a process for manufacturing hollow twist made of foamed synthetic resin which is suitable for use in knitting and weaving.

According to the known methods for spinning synthetic fibers, it is difficult to form fibers from synthetic resins, such as styrene, because of their molecular structure, and from vinyl resins because, though they can be made into fibers, they lack the specific characteristics of fibers. It is an object of the present invention to provide new uses for these synthetic resins by overcoming the above disadvantages and making these synthetic resins into very soft hollow twist containing independent foams in the twist having apparent density of 0.3 mm. to 0.4 mm. by a method entirely novel and different from the known methods for spinning synthetic resins.

Thin sheets of foamed synthetic resin, such as foamed polystyrene paper, are externally flat and lustrous papers. Such polystyrene paper is made from styrene resin into foamed sheets and is composed of an aggregation of independent foams. About 10-20% of the volume of foamed polystyrene paper is membranes of foams, i.e. the walls of each foam; the rest is composed of independent foams having air therein. Such foams are weak, often cracking when stretched. Moreover, the tensile strength is particularly weak. Polystyrene paper having a thickness of 0.08 mm. to 0.4 mm. has a similar appearance to that of ordinal paper but it is an aggregation of microangular foams. Thus, it is quite different from paper which is a mixture of pulp fibers. The polystyrene paper has inferiorities in softness and bending, so that its sole use has been very difficult due to its lack in strength. Therefore, up to the present, such a paper having more than 0.5 mm. thickness has only been used in the field of molded products where its thermoplastic property can be utilized.

Table I (see page 1) illustrates the comparative strengths of commercially available foamed polystyrene papers. It is preferable that such polystyrene paper has almost no linear orientation. By having little difference between tensile strength of longitudinal and traverse ways, shrinking of only one way by heating in a stage of molding is prevented.

Though polystyrene resin is thermoplastic, and molecules in it are connected like thread, the degree of crystallization of thread-like molecules is low and weak when compared with such synthetic fibers as polyvinyl alcohol and nylon. Accordingly, it has been difficult to extrude a solution of high-molecular fiber and to form fiber by elongation. Even when spun, the product is lacking in strength and, up to the present time, no use has been proposed in such a field.

TABLE I.—COMPARISON IN STRENGTH OF POLYSTYRENE PAPERS WITH ORDINAL PAPERS

| Sample Used | Thickness | | Tension | Tensile Strength in kg. | | Cracked Length in km. | | Elongation in percent | | Cracking Strength in g. | | Specific Cracking Strength | |
|---|---|---|---|---|---|---|---|---|---|---|---|---|---|
| | (g./m.²) | (mm./100) | | L. | T. | L. | T. | L. | T. | L. | T. | L. | T. |
| No. 6, 0.15 mm | 21.0 | 13.3 | 0.16 | 1.6 | 1.2 | 5.0 | 3.8 | 4.6 | 5.7 | 5 | 6 | 24 | 29 |
| No. 10, 0.25 mm | 22.1 | 16.5 | 0.13 | 1.8 | 1.3 | 5.4 | 3.9 | 7.1 | 6.3 | 5 | 4 | 23 | 18 |
| No. 20, 0.50 mm | 36.4 | 40.0 | 0.09 | 2.0 | 2.4 | 4.8 | 4.4 | 10.8 | 7.1 | 26 | 23 | 71 | 63 |
| No. 40, 1.00 mm | 81.9 | 71.8 | 0.11 | 3.4 | 3.0 | 2.8 | 2.4 | 3.7 | 4.2 | 32 | 28 | 39 | 34 |
| No. 60, 1.50 mm | 120.3 | 131.8 | 0.09 | 5.2 | 5.2 | 2.7 | 2.6 | 5.5 | 4.9 | | | | |
| Papers for Newspaper | 54.5 | 9.1 | 0.60 | 2.5 | 1.5 | 3.1 | 1.8 | 1.1 | 1.8 | 16 | 17 | 30 | 32 |
| Paper of Good Quality | 111.0 | 12.9 | 0.86 | 10.2 | 5.3 | 6.1 | 3.2 | 2.5 | 4.6 | 74 | 78 | 67 | 70 |

NOTE.—L. and T. stand for longitudinal and transverse ways, respectively.

---

According to the present invention, a synthetic resin having the above mentioned properties (e.g. foamed polystyrene paper) is cut in slender and long sheets. Various physical and chemical treatments are carried out so that its bending property and softness are enhanced without losing any of the original specific properties. In particular, tensile strength is improved by making the inside of the thread which contains the condensed independent foam layer, into an aggregated form of continuous layer. The apparent density is quite low, and, if desired, re-foaming can be done to swell the thread itself. Thus, the present invention produces a bulky thread of novel form having the above-mentioned favorable characteristics, which is suitable as twist for knitting, weaving and plaiting.

A state of aggregation of thin membranes of polystyrene resin which cover each foam, resembles states of fiber from carding to drawing stages in spinning of other fibrous materials, i.e., numerous single fibers combine in curved and cyclic shape being jumbled together. In the present invention, during the stages of heating, rolling, cutting, coating with synthetic resin solution, softening and elongation using softener or heating, temporary twinning, and cone winding, the wide roll of foamed polystyrene paper is compressed and elongated in its longitudinal way, so that foamed and swollen granular foams are changed into a slender and long shape in their longitudinal way and foam membranes (the cubically-combined thin membranes of polystyrene resin) are simultaneously elongated in their longitudinal way to change into long, slender, and numerous continuous fiber aggregation so that the desired hollow twist is obtained.

Changes in the state of foam polystyrene paper can be appreciated more readily by reference to the drawings wherein:

FIGURES 4 to 8 illustrate, in flow sheet form, the process for producing polystyrene twist according to the present invention;

Figure 2:
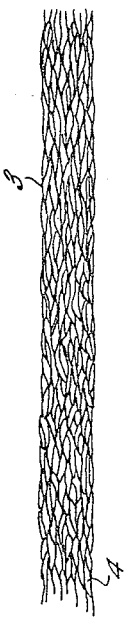
FIGURE 2 is a cross section illustrating the fibrous orientation of thin membrane of resin in its longitudinal way by deformation of foams wherein 3 is foam membranes arranged in fibrous form and 4 is foam deformed in spindle-shape.
Figure 1:
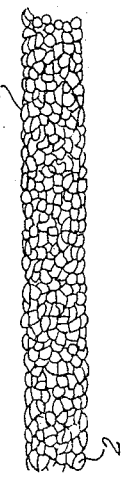
FIGURE 1 is a cross section illustrating a state of foams in the foamed synthetic resin in sheet form wherein 1 is an aggregation of foamed thin resin membrane and 2 is a hollow of foam.
Figure 3:
FIGURE 3 is an expanded cross section of hollow twist according to the present invention wherein 5 is an aggregated thin membrane in hollow fibrous form and 6 is a screwed portion in the twist.
Figure 4:
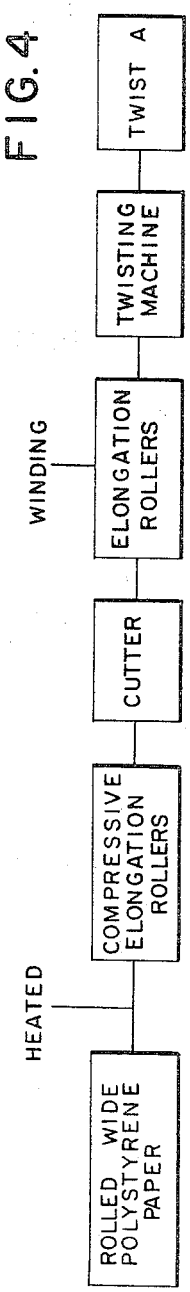

In the process of FIGURE 4, twist A is produced by heating, compressing and cutting in narrow width the compressed polystyrene, elongating it, softening it, strengthening it, and twisting it.

Figure 5:
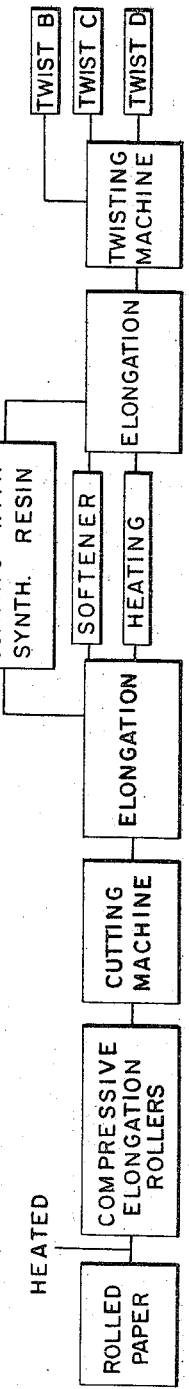

In the process of FIGURE 5, a synthetic resin solution, softening and heating are employed between two elongation steps. The synthetic resin solution is selected from the group consisting of polyvinyl acetate, polyvinyl butyral, polybutyl acrylate, polybutyl methacrylate, and polyvinyl chloride. The softener is selected from the group consisting of dibutyl phthalate, dioctyl phthalate, tricresyl phosphate, and dioctyl adipate. In twist B the synthetic resin solution is coated on cut sheets and then twisted. In twist C the cut sheets are passed through a softener solution, elongated, and twisted. In twist D sheets are heated by steam, hot water, or hot air, softened, elongated, and twisted.

The process of FIGURE 6 adds a "Temporary Twinning" step which gives temporary twinning to the passing sheets.

In FIGURE 7a, the twists obtained in FIGURES 4 to 6 are further softened and elongated.

In FIGURE 7b, the elongation step is repeated and the twist is coated with a synthetic resin solution to produce twist G.

In FIGURE 8, strong fibers such as polyethylene or Nylon are used as center of the twist in the twisting step, or, such fibers are cotwisted so that the strength of the resulting twist is increased.

The process of the present invention is further illustrated by the following non-limitative example.

*Example*

Foamed polystyrene paper 200 to 1000 mm. in width, 500 to 1000 mm. in length, 0.08 to 0.40 mm. in thickness, and 0.1–0.2 in specific gravity is untied from its roll, and passed through a pressure roller equipped with heating apparatus to strengthen the paper. After being cut, each sheet is elongated by passing it between rollers where the rolling speed of the send-in roller is slightly slower than that of the send-out roller. In order to prevent the cutting or cracking of sheet due to tension the speed and tension are preferably automatically controlled. Each cut sheet passing through these rollers then passes through a synthetic resin solution soaking bath which acts as a softener, or a heating apparatus either wet or dry (for example, steam, hot air, or warm water). Successively elongated sheets increase their orientation longitudinally. If necessary, a temporary twinning machine is employed and the softened sheet is passed through a conical nozzle (preferably made of chinaware) rotating in parallel to the direction of sheets and having slightly shorter hole than the width of the sheet, so that the sheets are screwed and longitudinal shrinks are produced giving a product like crumpled paper. The product produced has a width greater than 8 mm. and can be used as knitting or weaving material.

In the elongation of paper having a wide width, under heat and pressure, thin membranes of foams elongated in their longitudinal way change in fibrous orientation. If there is excessive elongation under strong tension, the desired orientation can be produced in the original wide width, and the desired tensile strength can be obtained. However, in such products, the resistance to the traverse tension is weak and, if the product is pulled during the cutting process, it may easily be cracked in its longitudinal way and sheets of uniform quality cannot be obtained. Also, each foam compressed and elongated in spindle shape is apt to return to its original granular shape as the tension decreases, and, since the greater the width, the greater the recovering action, it is necessary to carry out the elongation process repeatedly, corresponding to the tensile strength in elongation of wide paper, elongation of narrow sheet, and elongation in cone winding step of twist. Elongated and strengthened sheets are introduced into the twisting machine so that the twist is obtained. The resulting polystyrene twist differs from other kinds of twists in which many single fibers are twisted. It is made by twisting polystyrene sheets in screw-form and rolling under strong tension so that aggregation of fibrous membranes are doubled. In the resulting twist, a foam layer which is compressed and elongated in its longitudinal way is twisted in screw-like form and, therefore, the compressed foams are apt to be swollen and return to the original shape; thus the twist may often be looped. Such is often observed in the twist made from thick paper, or when twisted numbers are inadequate.

In order to prevent such a phenomenon and decrease the irregular twisting, the twist rolled up by bobbin is again elongated by the use of a cone winder. The cone winding process is a very important element of the present invention in which hollow twist is obtained starting from foamed synthetic resin. Polystyrene resin is weak and is not resistant to strong elongation in the order of 200 to 400% (which is common in spinning of other synthetic fibers). The present twist is composed of an aggregation of elongated thin membrane which is particular to foamed synthetic resin and, by twisting, the aggregation is increased and tensile strength is heightened so that, in the cone winding step, it can be reepeatedly elongated under more strong tension. During this step, when the twist is passed through the softener solution or wet or dry heating apparatus, aggregated and fibrous polystyrene resin is elongated in its longitudinal way in very long and slender shape under good softening conditions, so that molecular arrangement is improved and degree of crystallization is increased. Since the strength of a twist equals the combined strength of single fibers, the tensile strength of the twist can further be increased and stabilized. Since the twist is highly adiabatic, it is desired that, in elongation of the twist under heating, both the surface and the the inside of the twist are kept in uniform soft condition. Furthermore since foams are melted and combined together when excessively heated, it is necessary that heat be applied comparatively mildly and gradually. It is preferable that the heating temperature be in the range of 70 to 120° C. The running speed of the twist is preferably 10 to 15 m./min. The elongation of the twist is preferably 20 to 30%. By adjusting the thickness of the starting sheet, the width of the cut sheet, the degree of foaming, the degree of elongation, and the re-foaming of the twist, a product of any desired thickness can be obtained.

The results of tests on the properties of polystyrene twist according to the present invention are set forth in Tables II and III.

knitting. Moreover, while until now it has been difficult to contain foams inside of synthetic fibers and there has been no fiber whose apparent density is less than 0.5. Through the present invention, a somewhat thick hollow twist made of synthetic resin having less than 0.4 mm. apparent density can be obtained.

It is a further advantage of the present invention that products can be manufactured by a comparatively simple apparatus so that the cost of the product is low and, due

TABLE II.—TREATMENT CONDITIONS

[Sample used: Foamed polystyrene paper of 0.25 mm. thickness and 0.10 to 0.2 specific gravity]

|  | Width of Slit | | | |
| --- | --- | --- | --- | --- |
|  | 1/8 in. (3.17 mm.) | 3/16 in. (4.8 mm.) | 1/4 in. (6.3 mm.) | 5/16 in. (8.0 mm.) |
| Rotation of Spindles (rotations/minute) | 2,200 | 2,200 | 2,200 | 2,200 |
| Size of traveller | G-8-A | G-8-A | G-8-A | G-81-A |
| Twisted Numbers (T./m.) | 220 | 220 | 160 | 140 |
| Wetting Roll (r./m.) | 44 | 44 | 44 | 44 |

TABLE III.—RESULTS

|  | Width of Slit | | | | | | | | | | | |
| --- | --- | --- | --- | --- | --- | --- | --- | --- | --- | --- | --- | --- |
|  | 1/8 in. | | | 3/16 in. | | | 1/4 in. | | | 5/16 in. | | |
|  | A | B | F | A | B | F | A | B | F | A | B | F |
| Finesness (deniers) | 1,450 | 1,370 | 1,020 | 2,335 | 2,115 | 1,950 | 3,102 | 2,880 | 2,600 | 4,122 | 4,030 | 4,478 |
| Twisted Numbers (T./m.) | 266 | 272 | 268 | 224 | 224 | 238 | 184 | 168 | 172 | 168 | 167 | 160 |
| Rate of Shrinking (Percent) | 10.4 | 11.8 | 9.4 | 15.0 | 13.8 | 13.6 | 21.2 | 13.6 | 13.6 | 21.2 | 15.0 | 12.6 |
| Strength (g.) | 732 | 750 | 952 | 1,176 | 1,236 | 1,610 | 1,224 | 1,404 | 1,935 | 1,920 | 2,100 | 3,015 |
| Tenacity (g./denier) | 0.41 | 0.43 | 0.62 | 0.44 | 0.49 | 0.72 | 0.54 | 0.59 | 0.83 | 0.47 | 0.58 | 0.92 |
| Elongation (percent) | 13.5 | 12.8 | 12.0 | 10.4 | 11.8 | 10.8 | 11.0 | 11.6 | 10.6 | 12.8 | 10.8 | 10.0 |

Styrene and its derivatives including methylstyrene, dimethylstyrene, α-methylstyrene, and chlorostyrene, vinyl compounds and their derivatives including vinyl chloride, vinyl acetate, vinylidene chloride, and vinyl alcohol, cellulose derivatives including acetylcellulose and butylcellulose, acrylonitrile and methyl methacrylate and derivatives thereof, aldehydes and derivatives thereof and amides can all be used as resins in making hollow twist according to the present invention. In addition, polymers, copolymers, and mixtures of monomers selected from the above listed compounds may also be used in the present invention.

While twists according to the present invention may not be superior to such strong fibers as nylon in tenacity and elongation, they have sufficient mechanical strength to be durable for knitting and weaving treatments. The resulting polystyrene twist differs essentially from artificial fiber which is prepared by dissolving natural cellulose in solvent and making it into fibrous shape, synthetic fiber in which the polymer itself is chemically synthesized, or yarn twist obtained by orienting pulp fiber in its longitudinal way by its appearance, which is in the form of thick mono-filaments. Inside it has the characteristic structure, that is, it is composed of long-drained polystyrene resin thin membranes, having an aggregation of tube-like elongated foams in cross section and each foam or hollow contains air therein. Therefore, in the present invention, the twist is very light having apparent density of 0.3 mm. to 0.4 mm. and possesses excellent properties such as adiabatic, waterproof, and elastic properties, which cannot be found in other synthetic fibers.

In particular, the present invention presents great advances in the art in the following ways. The process of the instant invention now makes it possible for synthetic resins which could not be made into fibers by known methods to be made into twist suitable for weaving and knitting.

to its specific structure, the present twist has no such cold touch as other synthetic fibers have and, particularly, thick twist of the present inevntion has a puffy touch similar to wheat straw.

Products of the present invention exhibit beautiful luster which is specific to foamed synthetic resin. Coloring of the starting material is easy and a product of any desired color can be easily obtained.

Knitted sheet made from the present invention twist can be made in any desired shape by heating in a mold and, since the twist itself is refoamed by heating, meshes of knitted or woven product can be made uniform and compact.

In weaving or knitting the present invention twist, the loss is minimal, and, as a bulky yarn, the twist can be woven with other yarns. Woven or knitted products using the present invention twist are very firm, so that it is not necessary to starch, treat with resin, or line.

The surface of the woven or knitted product using the present invention twist can be partially heated for swelling (maximum foaming: 180%) so that jaggy patterns can freely be produced thereon.

The twist of the present invention is adiabatic, tone-absorbing, water-proof, water-resistant, electro-insulating, and elastic and, therefore, it has wide uses such as for aigrettes, hats, bags, fancy works, and clothes as well as such special clothes as water-proof, heat-proof, or cold-proof clothes, decorations in rooms, and packing materials.

More than 70% of the present twist is foams and, when it is woven with other yarns and the foams are vanished by treatment with a solvent, specific naked patterns or designs can be produced.

Other and further uses and advantages will be appreciated by those skilled in the art having reference to the aforesetforth disclosure and the appended claims.

What is claimed is:
1. A process for the production of a hollow twist for weaving and knitting which comprises the steps of:
   (a) forming a foamed synthetic resin into a sheet of predetermined width and heating to a temperature lower than the melting point of the fibers;
   (b) elongating said sheet and the foams contained therein; and
   (c) twisting said elongated sheet whereby said foams form an aggregation of continuous fiber.
2. A process according to claim 1 which comprises the further step of passing said elongated sheet through a synthetic resin coating solution to strengthen it prior to the twisting step.
3. A process according to claim 2 wherein the coating solution comprises in solution a synthetic resin selected from the group consisting of polyvinyl acetate, polyvinyl butyral, polybutyl acrylate, polybutyl methacrylate and polyvinyl chloride.
4. A process for the production of a hollow twist for weaving and knitting which comprises the steps of:
   (a) forming a foamed synthetic resin which is a member of the group of styrene, methylstyrene, dimethylstyrene, α-methylstyrene, chlorostyrene, vinyl chloride, vinyl acetate, vinylidene chloride, vinyl alcohol, acetylcellulose, butylcellulose, acrylonitrile, methacrylate, aldehydes, amides, copolymers and mixtures of monomers thereof, into a sheet of predetermined width;
   (b) heating said formed sheet;
   (c) cutting said sheet into predetermined lengths;
   (d) elongating said heated sheet under pressure;
   (e) twisting said softened elongated sheet whereby said foams form an aggregation of continuous longitudinal fiber.
5. A process for the production of a hollow twist for weaving and knitting which comprises the steps of:
   (a) cone winding the twist produced according to claim 1;
   (b) heating the wound twist;
   (c) elongating the heated twist;
   (d) passing the elongated twist through a softening solution; and
   (e) winding the softened twist.
6. A process according to claim 5 wherein the softening solution comprises in solution a softener selected from the group consisting of dibutyl phthalate, dioctyl phthalate, tricresyl phosphate and dioctyl adipate.
7. A process for the production of a hollow twist for weaving and knitting which comprises the steps of:
   (a) cone winding the twist produced according to claim 1;
   (b) passing the wound twist through a softening solution;
   (c) elongating the softened twist;
   (d) heating the elongated twist;
   (e) elongating the heated twist;
   (f) passing the elongated twist through a synthetic resin coating solution; and
   (g) winding the coated twist.

8. A hollow twist for weaving and knitting produced by the process of claim 1.
9. A process according to claim 4 wherein said elongation is conducted in two steps and said cut sheets are passed between said two steps into a softening solution which comprises a softener which is a member selected from the group consisting of dibutyl phthalate, dioctyl phthalate, tricresyl phosphate, and dioctyl adipate.
10. A process according to claim 4 wherein said elongation is conducted in two steps and said cut sheets are passed between said two steps through a resin coating solution which comprises a resin which is a member selected from the group consisting of polyvinyl acetate, polyvinyl butyral, polybutyl acrylate, polybutyl methacrylate and polyvinyl chloride.
11. A process according to claim 10, which additionally comprises subjecting said sheets, after passing through said coating solution to a twinning step.
12. A process according to claim 4 wherein said elongation is conducted in two steps and said cut sheets are heated to a temperature lower than the melting point of said resin, between said two steps.
13. A process according to claim 12 which additionally comprises passing said sheets after said second heating step to a twinning step.
14. A process according to claim 1, which additionally comprises subjecting said sheets after step (b) to a twinning step prior to said twisting.
15. A process according to claim 1 wherein said foamed synthetic resin sheet in said step (c) is twisted together with a fiber which is a member of the group consisting of nylon and polyethylene and said co-twisted product is subjected to a winding step.
16. A process according to claim 4 wherein said foamed synthetic resin sheet is twisted together with a fiber which is a member of the group consisting of nylon and polyethylene and said co-twisted product is subjected to a winding step.
17. A process according to claim 1 wherein said foamed synthetic resin is twisted in step (b) over a core of a fiber which is a member of the group consisting of nylon and polyethylene.

References Cited

UNITED STATES PATENTS

| | | | |
|---|---|---|---|
| 2,403,317 | 7/1946 | Warren | 57—140 |
| 2,862,284 | 12/1958 | Wiczer | 161—175 |
| 3,054,146 | 9/1962 | Griffin | 264—321 X |
| 3,082,483 | 3/1963 | Bickford | 264—321 |
| 3,091,017 | 5/1963 | Wetterau | 264—103 X |
| 3,094,374 | 6/1963 | Smith | 264—103 |
| 3,100,926 | 8/1963 | Richmond | 264—103 X |
| 3,243,485 | 3/1966 | Griffin | 264—321 X |
| 3,275,720 | 9/1966 | Ohsol | 264—54 X |

FRANK J. COHEN, *Primary Examiner.*

J. PETRAKES, *Examiner.*